(12) United States Patent
Pouran Ben Veyseh et al.

(10) Patent No.: US 12,105,748 B2
(45) Date of Patent: Oct. 1, 2024

(54) TUTORIAL RECOMMENDATION USING DISCOURSE-LEVEL CONSISTENCY AND ONTOLOGY-BASED FILTERING

(71) Applicant: ADOBE INC., San Jose, CA (US)

(72) Inventors: Amir Pouran Ben Veyseh, Eugene, OR (US); Franck Dernoncourt, San Jose, CA (US)

(73) Assignee: ADOBE INC., San Jose, CA (US)

( * ) Notice: Subject to any disclaimer, the term of this patent is extended or adjusted under 35 U.S.C. 154(b) by 427 days.

(21) Appl. No.: 17/454,411

(22) Filed: Nov. 10, 2021

(65) Prior Publication Data

US 2023/0140981 A1  May 11, 2023

(51) Int. Cl.
| | |
|---|---|
| *G06F 16/34* | (2019.01) |
| *G06F 16/335* | (2019.01) |
| *G06F 16/338* | (2019.01) |
| *G06F 16/36* | (2019.01) |
| *G06F 40/40* | (2020.01) |

(52) U.S. Cl.
CPC .......... *G06F 16/345* (2019.01); *G06F 16/335* (2019.01); *G06F 16/338* (2019.01); *G06F 16/367* (2019.01); *G06F 40/40* (2020.01)

(58) Field of Classification Search
CPC .............................. G06F 16/345; G06F 16/338
See application file for complete search history.

(56) References Cited

U.S. PATENT DOCUMENTS

| | | | | |
|---|---|---|---|---|
| 8,200,683 | B2* | 6/2012 | Gupta | G06F 16/3334 707/E17.014 |
| 8,886,648 | B1* | 11/2014 | Procopio | G06F 16/93 707/737 |
| 9,507,850 | B1* | 11/2016 | Hepp | G06F 16/951 |
| 2005/0289106 | A1* | 12/2005 | Petri | G06F 16/168 707/E17.14 |
| 2006/0265209 | A1* | 11/2006 | Bradford | G06F 40/42 704/9 |
| 2019/0205950 | A1* | 7/2019 | Balasubramanian | G06Q 30/0623 |

(Continued)

OTHER PUBLICATIONS

Bojanowski, et al., "Enriching Word Vectors with Subword Information", Transactions of the Association for Computational Linguistics, vol. 5, pp. 135-146, 2016, preprint arXiv:1607.04606.

(Continued)

*Primary Examiner* — Shaun Roberts
(74) *Attorney, Agent, or Firm* — F. CHAU & ASSOCIATES, LLC

(57) ABSTRACT

Systems and methods for item recommendation are described. One or more embodiments of the systems and methods include generating a hidden vector representation for each word of a source document; removing at least one word from the source document based on the hidden vector representation using a summarization network to obtain a summary document; filtering a plurality of candidate documents based on the source document to obtain a plurality of filtered candidate documents; comparing the summary document to each of the filtered candidate documents to obtain a ranking score for each of the filtered candidate documents; and identifying a relevant candidate document from the filtered candidate documents based on the ranking score.

19 Claims, 11 Drawing Sheets

(56) References Cited

U.S. PATENT DOCUMENTS

| | | | | |
|---|---|---|---|---|
| 2019/0303499 A1* | 10/2019 | Sharma | ................ | G06V 10/761 |
| 2019/0362020 A1* | 11/2019 | Paulus | .............. | G06F 18/24143 |
| 2020/0134016 A1* | 4/2020 | Cao | ....................... | G06F 40/284 |
| 2020/0311214 A1* | 10/2020 | Chatterjee | .............. | G06N 20/00 |
| 2021/0109968 A1* | 4/2021 | Kim | ..................... | G06V 30/416 |
| 2021/0312914 A1* | 10/2021 | Hedayatnia | ............. | G10L 19/00 |
| 2022/0114340 A1* | 4/2022 | Graeser | ................. | G06N 3/045 |
| 2022/0179871 A1* | 6/2022 | Ahmed | ................. | G06N 20/00 |
| 2022/0237373 A1* | 7/2022 | Singh Bawa | ........... | G06F 40/20 |
| 2022/0414329 A1* | 12/2022 | Bulu | .................... | G06F 40/279 |

OTHER PUBLICATIONS

Shahmirzadi, et al., "Text Similarity in Vector Space Models: A Comparative Study", In 2019 18th IEEE International Conference on Machine Learning and Applications (ICMLA), pp. 659-666, arXiv preprint arXiv:1810.00664v1 [cs.CL] Sep. 24, 2018.

Zhang, et al., "Character-level Convolutional Networks for Text Classification", 2015. arXiv preprint arXiv:1509.01626, 9 pages.

* cited by examiner

TUTORIAL RECOMMENDATION USING DISCOURSE-LEVEL CONSISTENCY AND ONTOLOGY-BASED FILTERING

BACKGROUND

The following relates generally to natural language processing, and more specifically to item recommendation using machine learning.

Natural language processing (NLP) refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. These models can express the relative probability of multiple answers.

Item recommendation refers to the task of collecting data relating to user interactions, modelling user behavior, and using the model to predict items that users are likely to interact with. For example, the user may click on a sequence of items in an online store, and a website server can predict a next item that the user is likely to view or purchase. In another example, documents and videos can be recommended to users based on relevance to their interests.

However, conventional recommendation systems are not able to make recommendation based on a large and noisy source document. Additionally, these systems fail to incorporate background knowledge and discourse-level consistency information. Therefore, there is a need in the art for an improved recommendation network that is scalable, accurate, and can perform accurately on large and noisy source documents.

SUMMARY

The present disclosure describes systems and methods for natural language processing. Embodiments of the disclosure provide a recommendation apparatus trained using machine learning to locate related candidate documents based on a media file (e.g., audio, video). A summarization network of the recommendation apparatus generates summary text of a source document transcribed from the media file. A filtering component can filter a set of candidate documents based on domain-specific knowledge (e.g., tool names) and string similarity. In some examples, the summarization network is trained using unsupervised learning (e.g., contrastive learning).

A method, apparatus, and non-transitory computer readable medium for item recommendation are described. One or more embodiments of the method, apparatus, and non-transitory computer readable medium include generating a hidden vector representation for each word of a source document; removing at least one word from the source document based on the hidden vector representation using a summarization network to obtain a summary document; filtering a plurality of candidate documents based on the source document to obtain a plurality of filtered candidate documents; comparing the summary document to each of the filtered candidate documents to obtain a ranking score for each of the filtered candidate documents; and identifying a relevant candidate document from the filtered candidate documents based on the ranking score.

A method, apparatus, and non-transitory computer readable medium for training a neural network are described. One or more embodiments of the method, apparatus, and non-transitory computer readable medium include receiving training data including a source document and a plurality of candidate documents; generating a hidden vector representation for each word of the source document; removing at least one word from the source document based on the hidden vector representation to obtain a summary document using a summarization network; filtering the plurality of candidate documents based on the source document to obtain a plurality of filtered candidate documents; comparing the summary document to each of the filtered candidate documents to obtain a ranking score for each of the filtered candidate documents using a text classification network; identifying a relevant candidate document from the filtered candidate documents based on the ranking score; computing a loss function using contrastive learning; and updating parameters of the summarization network based on the loss function.

An apparatus and method for item recommendation are described. One or more embodiments of the apparatus and method include a word embedding component configured to generate a hidden vector representation for each word of a source document; a summarization network configured to remove at least one word from the source document based on the hidden vector representation to obtain a summary document; a filtering component configured to filter a plurality of candidate documents based on the source document to obtain a plurality of filtered candidate documents; and a ranking network configured to compare the summary document to each of the filtered candidate documents to obtain a ranking score for each of the filtered candidate documents.

DETAILED DESCRIPTION

Figure 1:
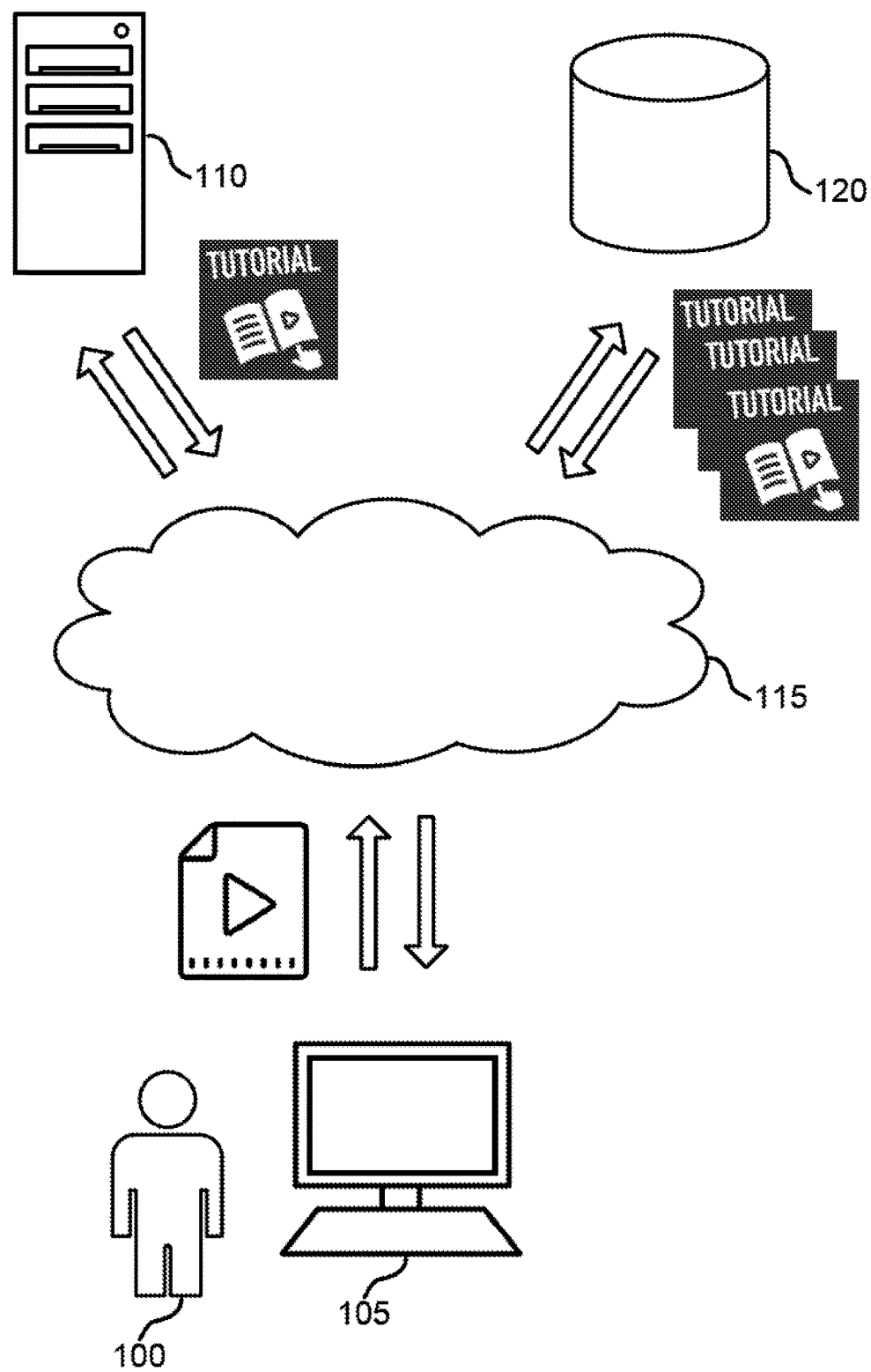
FIG. 1 shows an example of a tutorial recommendation system according to aspects of the present disclosure.

The present disclosure describes systems and methods for natural language processing. Embodiments of the disclosure provide a recommendation apparatus trained using machine learning to locate related candidate documents based on a media file (e.g., audio, video). In some embodiments, the system generates summary text of a source document transcribed from the media file. A set of candidate documents (i.e., documents that can be recommended) is then filtered based on domain-specific knowledge (e.g., tool names) and string similarity. Documents can be recommended from the filtered list. For example, a transcript can be generated for a media file, and a similarity score can be computed between the transcript and each of the filtered candidate documents.

Conventional recommendation systems generate recommendations based on text classification or text similarity. Classification systems classify input text into a pre-defined category based on available tutorials. Similarity-based systems evaluate similarity between a candidate content and target document. However, text classification and similarity-based system can depend on manually labeled data and human supervision for training. Additionally, these systems fail to incorporate background knowledge (e.g., concepts or keywords) associated with a target media file.

Embodiments of the present disclosure include an improved recommendation system that is scalable to handle a lengthy source document (e.g., a video that may be hours long) while generating accurate recommendations. Long videos can include a large amount of irrelevant text. Thus, in some embodiments, a summarization network is configured to remove irrelevant words from a source document to obtain a summary document.

Furthermore, embodiments incorporate background knowledge by filtering candidate texts. By incorporating domain background knowledge (e.g., ontology of concepts or keywords in the video domain) and calculating a ranking score based on discourse-level consistency between two text documents, embodiments of the present disclosure provide a recommendation network that can perform efficient document recommendation based on large and noisy input files. For example, domain specific knowledge such as tool names can be used to filter tutorials related and provide relevant tutorial recommendations. As a result, the recommendation network can be applied in a livestream video-sharing platform to recommend tutorials similar to content of large videos lasting hours.

Embodiments of the present disclosure may be used in the context of item recommendation. For example, a recommendation network based on the present disclosure may take source document as a query, and efficiently search through database to find candidate documents relevant to the query. An example application of the inventive concept in the recommendation context is provided with reference to FIGS. 1-2. Details regarding the architecture of an example recommendation apparatus are provided with reference to FIGS. 3-4. An example of a process for item recommendation are provided with reference to FIGS. 5-9. A description of an example training process is described with reference to FIG. 10-11.

Tutorial Recommendation Application

FIG. 1 shows an example of a tutorial recommendation system according to aspects of the present disclosure. The example shown includes user 100, user device 105, recommendation apparatus 110, cloud 115, and database 120. Recommendation apparatus 110 is an example of, or includes aspects of, the corresponding element described with reference to FIG. 3.

In the example of FIG. 1, user 100 provides a media file (e.g., a video). In some examples, user 100 selects a live-streamed video and is interested in knowing what tutorials in database 120 are the most relevant to the given video file. A set of tutorials (i.e., candidate documents) may be stored in a database of a website server (e.g., database 120). The user 100 communicates with the recommendation apparatus 110 via the user device 105 and the cloud 115. The user device 105 transmits the media file to the recommendation apparatus 110 to find related tutorial information (i.e., candidate documents stored within the database 120).

The user device 105 may be a personal computer, laptop computer, mainframe computer, palmtop computer, personal assistant, mobile device, or any other suitable processing apparatus. In some examples, the user device 105 includes software that incorporates a recommendation application (e.g., a dialogue system). The recommendation application may either include or communicate with the recommendation apparatus 110.

A user interface may enable a user 100 to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device 105 and rendered locally by a browser. In some examples, the recommendation application may be implemented on user device 105.

The recommendation apparatus 110 transcribes the media file to obtain a source document. A word embedding component of the recommendation apparatus 110 generates a hidden vector representation for each word of the source document. The recommendation apparatus 110 removes at least one word from the source document based on the hidden vector representation using a summarization network to obtain a summary document. The summary document is a shorter version of the source document but can still preserve important information in the source document. The recommendation apparatus 110 filters a set of candidate documents based on the source document to obtain a plurality of filtered candidate documents. A ranking network then compares the summary document to each of the filtered candidate documents to obtain a ranking score for each of the filtered candidate documents.

The recommendation apparatus 110 identifies a relevant candidate document from the filtered candidate documents based on the ranking score (via a user interface of the recommendation apparatus 110) and returns the relevant candidate document to user 100. The relevant tutorials are presented to the user 100. The process of using the recommendation apparatus 110 to perform tutorial search is further described with reference to FIG. 2.

The recommendation apparatus 110 includes a computer implemented network comprising a word embedding component, a summarization network, a filtering component, a ranking network, and a transcribing component. The recommendation apparatus 110 generates a hidden vector representation for each word of a source document; removes at least one word from the source document based on the hidden vector representation using a summarization network to obtain a summary document; filters a set of candidate documents based on the source document to obtain a plurality of filtered candidate documents; compares the summary document to each of the filtered candidate documents to obtain a ranking score for each of the filtered candidate documents; and identifies a relevant candidate document from the filtered candidate documents based on the ranking score.

The recommendation apparatus 110 may also include a processor unit, a memory unit, an I/O module, and a training component. The training component is used to train a machine learning model (or a recommendation network). Additionally, the recommendation apparatus 110 can communicate with the database 120 via the cloud 115. In some cases, the architecture of the recommendation network is also referred to as a network model or a machine learning model. Further detail regarding the architecture of the recommendation apparatus 110 is provided with reference to FIGS. 3 and 4. Further detail regarding the operation of the recommendation apparatus 110 is provided with reference to FIGS. 5-9.

In some cases, the recommendation apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud 115 is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, database 120 stores a set of candidate documents (e.g., tutorials) which may be retrieved by the recommendation apparatus 110 in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
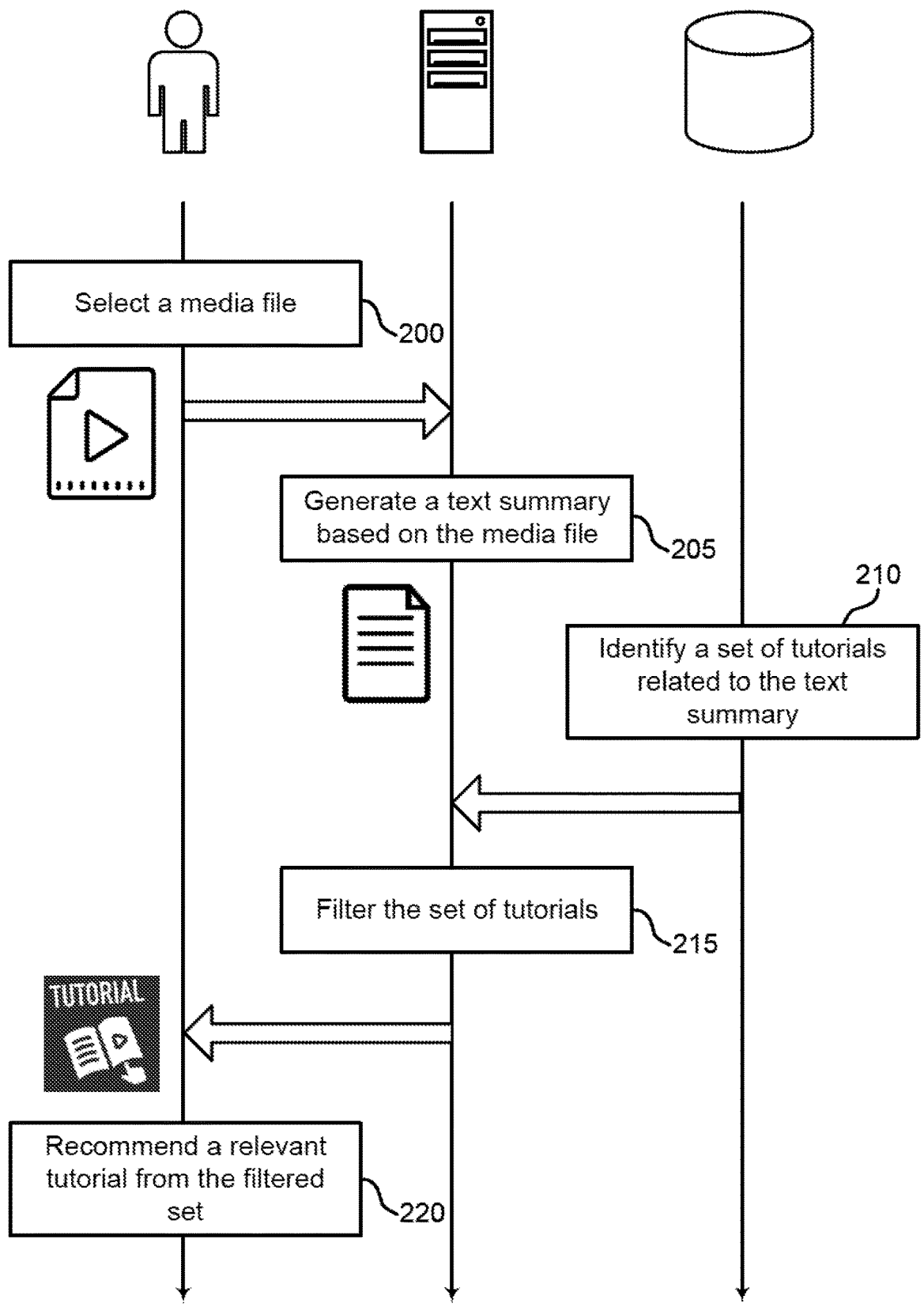
FIG. 2 shows an example of tutorial recommendation according to aspects of the present disclosure.

FIG. 2 shows an example of tutorial recommendation according to aspects of the present disclosure. The recommendation apparatus can be used in a web-based tutorial search application to perform search based on user-selected media file (e.g., a video). In some examples, a user is interested in retrieving relevant and accurate tutorials based on the media file.

At operation 200, a user selects a media file. In some cases, the operations of this step refer to, or may be performed by, a user as described with reference to FIG. 1. The media file can be transcribed to obtain a source document. In some examples, given the transcript of a live-streamed video, the user wants to find tutorials that are the most related to the given video. For example, for a given live-streamed video, a related video could be shown as a tutorial recommendation. A system can automatically obtain transcripts from the input video and textual content for the tutorials.

At operation 205, the system generates a text summary based on the media file. In some cases, the operations of this step refer to, or may be performed by, a recommendation apparatus as described with reference to FIGS. 1 and 3. The source document is a video-to-text transcribed copy of content based on the media file (e.g., video), but it may be lengthy depending on the length of the media file. In some examples, a video may last for a few hours. A summarization network of the recommendation apparatus removes at least one word from the source document to obtain text summary. The text summary preserves important information from the original source document.

At operation 210, the system identifies a set of tutorials related to the text summary. In some cases, the operations of this step refer to, or may be performed by, a recommendation apparatus as described with reference to FIGS. 1 and 3. A set of candidate documents (e.g., tutorials) are stored in a database associated with tutorial search engine or a server (see database in FIG. 1).

At operation 215, the system filters the set of tutorials. In some cases, the operations of this step refer to, or may be performed by, a recommendation apparatus as described with reference to FIGS. 1 and 3. A filtering component of the recommendation apparatus is configured to filter a set of candidate documents based on the source document to obtain a set of filtered candidate documents. A number of the set of filtered candidate documents is less than a number of the set of candidate documents.

At operation 220, the system recommends a relevant tutorial from the filtered set. In some cases, the operations of this step refer to, or may be performed by, a recommendation apparatus as described with reference to FIGS. 1 and 3.

The system automatically detects the tutorial with high relevance for a specific video. The system relies on a transcription of the video to locate relevant tutorials. In some cases, tutorials may be directly used in a livestream video-sharing platform to provide additional useful information with respect to the content of a video. For example, the recommendation apparatus can be used to identify informative videos on a video platform such as Adobe® Behance or Blink.

Architecture

Figure 3:
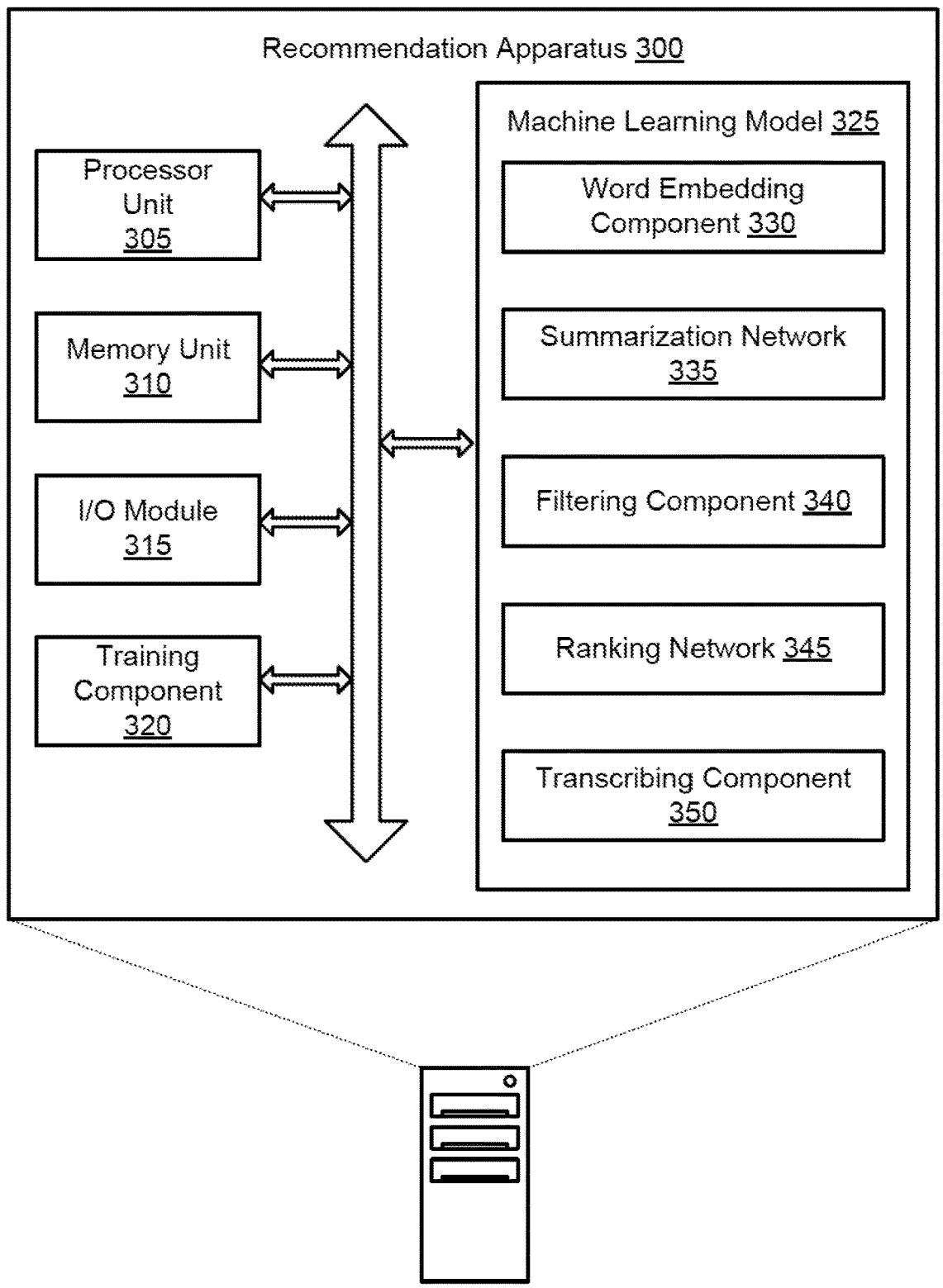
FIG. 3 shows an example of an item recommendation apparatus according to aspects of the present disclosure.
Figure 4:
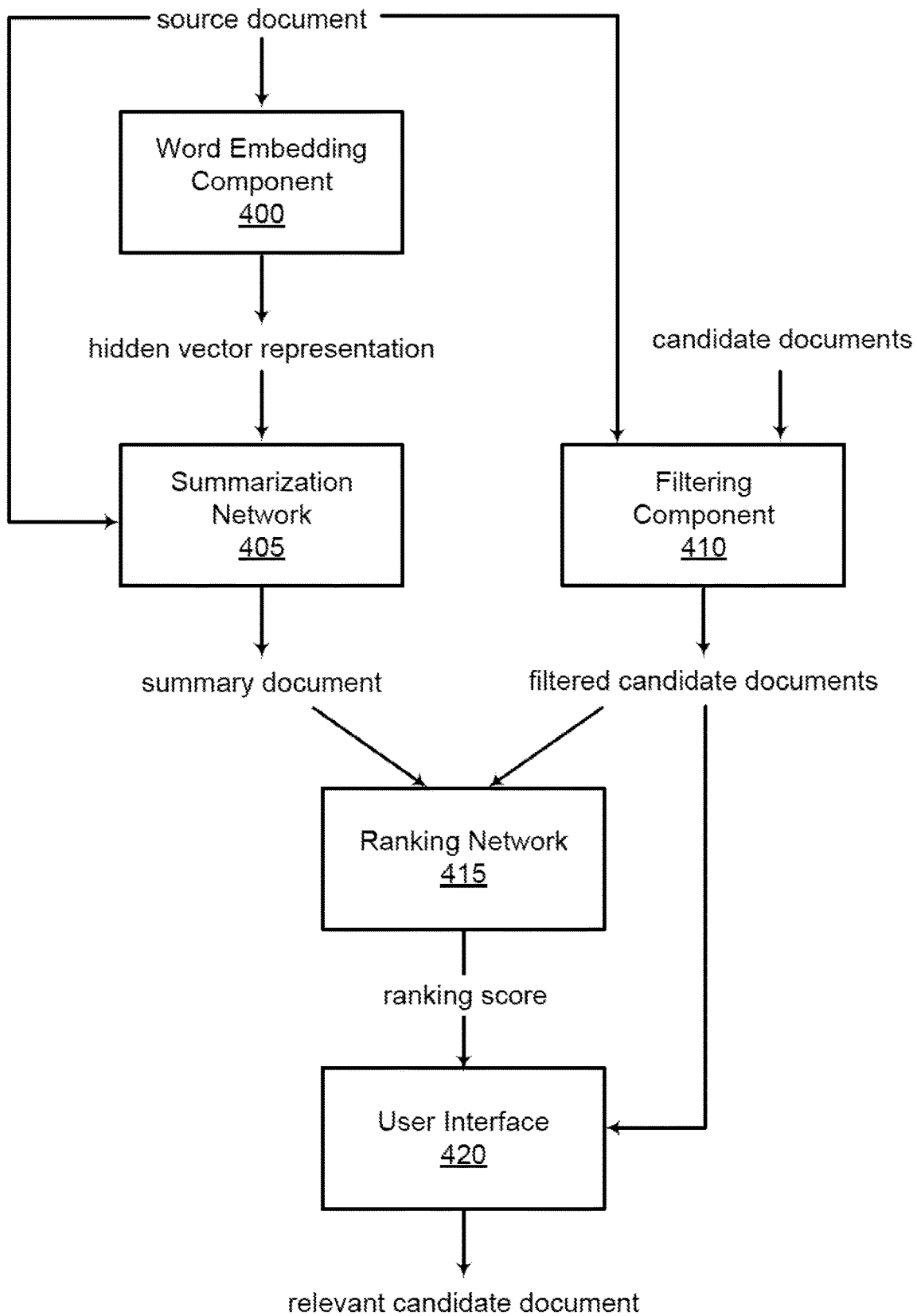
FIG. 4 shows an example of an item recommendation diagram according to aspects of the present disclosure.

In FIGS. 3-4, an apparatus for item recommendation is described, along with methods for utilizing the apparatus. One or more embodiments of the apparatus and method include a word embedding component configured to generate a hidden vector representation for each word of a source document; a summarization network configured to remove at least one word from the source document based on the hidden vector representation to obtain a summary document; a filtering component configured to filter a plurality of candidate documents based on the source document to obtain a plurality of filtered candidate documents; and a ranking network configured to compare the summary document to each of the filtered candidate documents to obtain a ranking score for each of the filtered candidate documents.

Some examples of the apparatus and method further include a user interface configured to identify a relevant candidate document from the filtered candidate documents based on the ranking score. Some examples of the apparatus and method further include a transcribing component configured to transcribe a media file to obtain the source document. In some examples, the ranking network is configured to sort the filtered candidate documents based on the ranking score for each of the filtered candidate documents, and display the sorted filtered candidate documents.

FIG. 3 shows an example of an item recommendation apparatus according to aspects of the present disclosure. The example shown includes recommendation apparatus 300, processor unit 305, memory unit 310, I/O module 315, training component 320, and machine learning model 325. Machine learning model 325 further includes word embedding component 330, summarization network 335, filtering component 340, ranking network 345, and transcribing component 350. Recommendation apparatus 300 is an example of, or includes aspects of, the corresponding element described with reference to FIG. 1.

A processor unit 305 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 305 is configured to operate a memory array using a memory controller. In other cases, a memory controller is integrated into the processor. In some cases, the processor unit 305 is configured to execute computer-readable instructions stored in a memory to perform various functions. In some embodiments, a processor unit 305 includes special purpose components for modem processing, baseband processing, digital signal processing, or transmission processing.

Examples of a memory unit 310 include random access memory (RAM), read-only memory (ROM), or a hard disk. Examples of memory unit 310 include solid state memory and a hard disk drive. In some examples, a memory unit 310 is used to store computer-readable, computer-executable software including instructions that, when executed, cause a processor to perform various functions described herein. In some cases, the memory unit 310 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 410 store information in the form of a logical state.

I/O module 315 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O module 315 includes a user interface. A user interface may enable a user to interact with a device. In some embodiments, the user interface may include an audio device, such as an external speaker system, an external display device such as a display screen, or an input device (e.g., remote control device interfaced with the user interface directly or through an IO controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, the recommendation apparatus includes a computer implemented artificial neural network (ANN) for item recommendation. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, training component 320 receives training data including a source document and a set of candidate documents. In some examples, training component 320 computes a loss function using contrastive learning. Then, training component 320 updates parameters of the summarization network 335 based on the loss function. In some examples, training component 320 computes a distinctiveness loss such that text of the additional summary document is substantially different from content of the summary document, where the parameters of the summarization network 335 are updated based on the distinctiveness loss.

In some examples, training component 320 selects a negative sample for a source document, where content of the negative sample is a concatenation of vector representation of the source document and summary of a randomly selected source document. Additionally, training component 320 selects a positive sample for the source document, where content of the positive sample is a concatenation of vector representation of the source document and the summary document. Then, training component 320 computes an information retaining loss based on the positive sample and the negative sample. A contrastive learning loss can be based on the information retaining loss. In some examples, training component 320 updates parameters of the text classification network jointly with the parameters of the summarization network 335.

In some embodiments, word embedding is a learned representation for text where words that have the same meaning, have a similar representation. For example, Glove and Word2vec are examples of systems for obtaining a vector representation of words. GloVe is an unsupervised algorithm for training a network using on aggregated global word-word co-occurrence statistics from a corpus. Similarly, a Word2vec model may include a shallow neural network trained to reconstruct the linguistic context of words. GloVe and Word2vec models may take a large corpus of text and produce a vector space as output. In some cases, the vector space may have a large number of dimensions. Each word in the corpus is assigned a vector in the space. Word vectors are positioned in the vector space in a manner such that similar words are located nearby in the vector space. In some cases, an embedding space may include syntactic or context information in additional to semantic information for individual words.

According to an embodiment, the recommendation network is based on a bidirectional encoder representations from transformers (BERT) architecture. In some examples, BERT is used as a language representation model, and is configured to pretrain deep bidirectional representations from unlabeled text by jointly conditioning on both left and right context in all layers. As a result, the pre-trained BERT model can be finetuned with an additional output layer to create network models for specific tasks (e.g., question answering and language inference).

In some examples, BERT uses a masked language model (MLM or Masked LM) pre-training objective to alleviate the unidirectionality constraint. The masked language model randomly masks some of the tokens from the input, and the objective is to predict the original vocabulary id of the masked word based only on its context. Unlike left-to-right language model pre-training, the MLM objective enables the representation to fuse the left and the right context, which pretrains a deep bidirectional transformer. In addition to the masked language model, BERT includes a next sentence prediction (NSP) task that jointly pretrains text-pair representations.

A BERT model may also be applied to a recommendation task. A BERT recommendation network may learn based on a bidirectional model, while other sequential networks are limited to left-to-right unidirectional models which predict next item sequentially. For example, a two-layer transformer decoder (i.e., Transformer language model) may be used to capture user's sequential behaviors (i.e., for sequential recommendation). In some cases, a transformer model may be a unidirectional model using a casual attention mask.

According to some embodiments, word embedding component 330 generates a hidden vector representation for each word of a source document. In some examples, word embedding component 330 computes an average of word piece representations for a set of word pieces corresponding to a composite word of the source document to obtain the hidden vector representation corresponding to the composite word. Word embedding component 330 is an example of, or includes aspects of, the corresponding element described with reference to FIG. 4.

According to some embodiments, summarization network 335 removes at least one word from the source document based on the hidden vector representation to obtain a summary document. In some examples, summarization network 335 generates a relevance value for each word of the source document. Additionally, summarization network 335 determines that the relevance value corresponding to the at least one word is below a threshold value, where the at least one word is removed from the source document based on the determination.

In some examples, summarization network 335 generates an additional summary document based on an additional source document. In some examples, the summarization network 335 includes a pre-trained encoder and a feed forward network. Summarization network 335 is an example of, or includes aspects of, the corresponding element described with reference to FIG. 4.

According to some embodiments, filtering component 340 filters a set of candidate documents based on the source document to obtain a set of filtered candidate documents. In some examples, filtering component 340 identifies a set of domain topics based on the source document. Additionally, filtering component 340 determines whether each of the set of candidate documents corresponds to one of the set of domain topics, where the set of candidate documents is filtered based on the determination. In some examples, the set of domain topics include a tool name. In some examples, filtering component 340 computes a mutual information value between each of the set of candidate documents and the source document. Then, filtering component 340 computes a similarity score for each of the set of candidate documents based on the mutual information value, where the set of candidate documents is filtered based on the similarity score. Filtering component 340 is an example of, or includes aspects of, the corresponding element described with reference to FIG. 4.

According to some embodiments, ranking network 345 compares the summary document to each of the filtered candidate documents to obtain a ranking score for each of the filtered candidate documents. In some examples, ranking network 345 computes a string similarity between the summary document and each of the set of candidate documents, where the ranking score is based on the string similarity. In some examples, ranking network 345 concatenates each of the set of candidate documents with the summary document to obtain a combined document for each of the set of candidate documents. Additionally, ranking network 345 computes a discourse similarity for each of the set of candidate documents based on the combined document, where the ranking score is based on the discourse similarity. In some examples, ranking network 345 sorts the filtered candidate documents based on the ranking score for each of the filtered candidate documents.

In some examples, the ranking network 345 is configured to sort the filtered candidate documents and display the sorted filtered candidate documents. Ranking network 345 is an example of, or includes aspects of, the corresponding element described with reference to FIG. 4. According to some embodiments, transcribing component 350 transcribes a media file to obtain the source document.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 4 shows an example of an item recommendation diagram according to aspects of the present disclosure. The item recommendation diagram of FIG. 4 shows the relationship between elements of the recommendation apparatus described with reference to FIG. 3. The example shown includes word embedding component 400, summarization network 405, filtering component 410, ranking network 415, and user interface 420.

As an example diagram illustrated in FIG. 4 (from top to bottom), a source document is input to a word embedding component 400 such as BERT. BERT model is used to obtain the hidden vector representation. Word embedding component 400 is an example of, or includes aspects of, the corresponding element described with reference to FIG. 3.

The hidden vector representation is input into summarization network 405. Summarization network 405 can preserve important information from the source document and generate a shorter version of the document. Summarization network 405 is an example of, or includes aspects of, the corresponding element described with reference to FIG. 3.

Filtering component 410 can filter a set of candidate documents based on the source document to obtain a set of filtered candidate documents. Filtering component 410 is an example of, or includes aspects of, the corresponding element described with reference to FIG. 3.

Both the summary document and filtered candidate documents are input to ranking network 415. Ranking network 415 compares the summary document to each of the filtered candidate documents to obtain a ranking score for each of the filtered candidate documents. Ranking network 415 then generates a ranking score. Ranking network 415 is an example of, or includes aspects of, the corresponding element described with reference to FIG. 3.

According to some aspects, user interface 420 identifies a relevant candidate document from the filtered candidate documents based on the ranking score. In some examples, user interface 420 displays the sorted filtered candidate documents.

Inference

In FIGS. 5-9, a method, apparatus, and non-transitory computer readable medium for item recommendation are described. One or more embodiments of the method, apparatus, and non-transitory computer readable medium include generating a hidden vector representation for each word of a source document; removing at least one word from the source document based on the hidden vector representation using a summarization network to obtain a summary document; filtering a plurality of candidate documents based on the source document to obtain a plurality of filtered candidate documents; comparing the summary document to each of the filtered candidate documents to obtain a ranking score for each of the filtered candidate documents; and identifying a relevant candidate document from the filtered candidate documents based on the ranking score.

Some examples of the method, apparatus, and non-transitory computer readable medium further include transcribing a media file to obtain the source document. Some examples of the method, apparatus, and non-transitory computer readable medium further include generating a relevance value for each word of the source document. Some examples further include determining that the relevance value corresponding to the at least one word is below a threshold value, wherein the at least one word is removed from the source document based on the determination.

Some examples of the method, apparatus, and non-transitory computer readable medium further include computing an average of word piece representations for a plurality of word pieces corresponding to a composite word of the source document to obtain the hidden vector representation corresponding to the composite word. Some examples of the method, apparatus, and non-transitory computer readable medium further include identifying a plurality of domain topics based on the source document. Some examples further include determining whether each of the plurality of candidate documents corresponds to one of the plurality of domain topics, wherein the plurality of candidate documents is filtered based on the determination. In some examples, the plurality of domain topics comprises a tool name.

Some examples of the method, apparatus, and non-transitory computer readable medium further include computing a mutual information value between each of the plurality of candidate documents and the source document. Some examples further include computing a similarity score for each of the plurality of candidate documents based on the mutual information value, wherein the plurality of candidate documents is filtered based on the similarity score. Some examples of the method, apparatus, and non-transitory computer readable medium further include computing a string similarity between the summary document and each of the plurality of candidate documents, wherein the ranking score is based on the string similarity.

Some examples of the method, apparatus, and non-transitory computer readable medium further include concatenating each of the plurality of candidate documents with the summary document to obtain a combined document for each of the plurality of candidate documents. Some examples further include computing a discourse similarity for each of the plurality of candidate documents based on the combined document, wherein the ranking score is based on the discourse similarity.

Some examples of the method, apparatus, and non-transitory computer readable medium further include sorting the filtered candidate documents based on the ranking score for each of the filtered candidate documents. Some examples of the method, apparatus, and non-transitory computer readable medium further include displaying the sorted filtered candidate documents.

Figure 5:
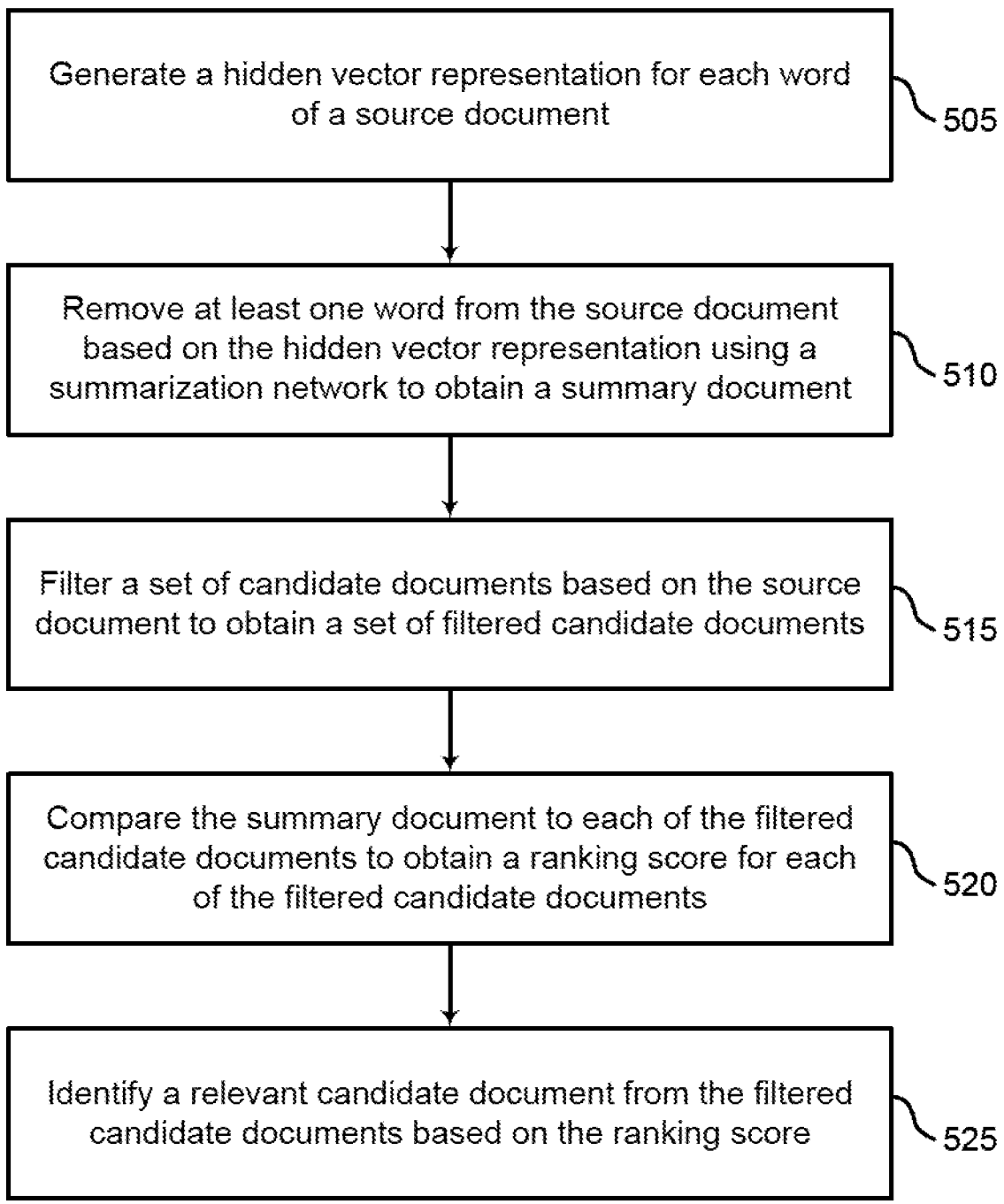
FIG. 5 shows an example of item recommendation according to aspects of the present disclosure.

FIG. 5 shows an example of item recommendation according to aspects of the present disclosure. Item recommendation can be performed by the recommendation apparatus and its various components/networks as described in FIGS. 3 and 4. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system generates a hidden vector representation for each word of a source document. In some cases, the operations of this step refer to, or may be performed by, a word embedding component as described with reference to FIGS. 3 and 4.

In some examples, the source document is transcribed from a video via a transcribing component. A word embedding component (e.g., BERT) may be used to generate hidden vector representation for each word of a source document. According to an embodiment, the input to the system is a transcript (i.e., the source document) including n words. The recommendation apparatus is configured to locate and display the most relevant tutorial from a pool of tutorial textual content. The recommendation apparatus includes multiple components/networks (i.e., filtering component, transcript summarization network, ranking network, etc.).

At operation 510, the system removes at least one word from the source document based on the hidden vector representation using a summarization network to obtain a summary document. In some cases, the operations of this step refer to, or may be performed by, a summarization network as described with reference to FIGS. 3 and 4.

According to an embodiment, a transcript summarization network is trained using unsupervised deep learning and the trained network can summarize a given transcript and preserve important information for identifying relevant tutorials from a candidate pool. Detail regarding using the summarization network to obtain a shorter summary text is described in FIG. 6. Detail regarding training the summarization network is described in FIGS. 10 and 11.

At operation 515, the system filters a set of candidate documents based on the source document to obtain a set of filtered candidate documents. In some cases, the operations of this step refer to, or may be performed by, a filtering component as described with reference to FIGS. 3 and 4.

In some examples, the machine learning model (as described in FIG. 3) includes a filtering component which removes one or more tutorials that are not relevant to a given transcript. The filtering component can use domain-specific knowledge to assess the relevance between a given transcript and the textual content of each tutorial in the candidate pool. Detail regarding filtering a set of candidate documents to obtain a filtered set is described in FIGS. 7 and 8.

At operation 520, the system compares the summary document to each of the filtered candidate documents to obtain a ranking score for each of the filtered candidate documents. In some cases, the operations of this step refer to, or may be performed by, a ranking network as described with reference to FIGS. 3 and 4.

According to an embodiment, a ranking network of the system uses the summary of a given transcript and the filtered list of relevant tutorials. The ranking network uses multiple metrics to sort the tutorials based on relevance and similarity to the transcript. In some examples, the ranking network calculates ranking scores and sorts the set of candidate tutorials based on their relevance to the given transcript based on string similarity and discourse similarity. Detail regarding sorting the filtered candidate documents based on a ranking score is described in FIG. 9.

At operation 525, the system identifies a relevant candidate document from the filtered candidate documents based on the ranking score. In some cases, the operations of this step refer to, or may be performed by, a user interface as described with reference to FIG. 4. In some examples, the relevant candidate document may be a tutorial that suits user interest and may be consistent with the user history or interaction with an online platform or a software application.

Figure 6:
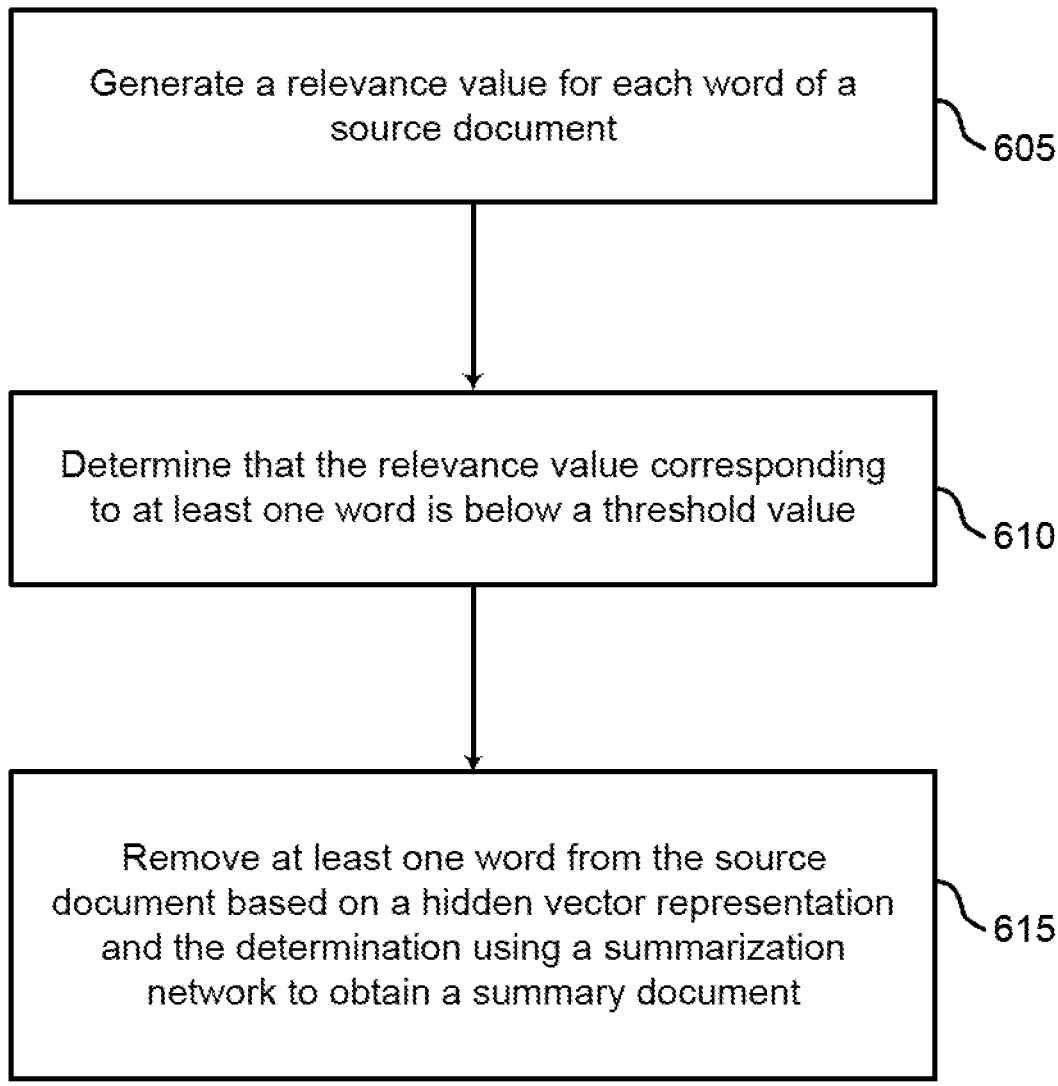
FIG. 6 shows an example of summarizing a document according to aspects of the present disclosure.

FIG. 6 shows an example of summarizing a document according to aspects of the present disclosure. A process of summarizing a long transcript into a relatively short document can be performed by a summarization network of the machine learning model as described in FIG. 3. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system generates a relevance value for each word of a source document. In some cases, the operations of this step refer to, or may be performed by, a summarization network as described with reference to FIGS. 3 and 4.

According to an embodiment, the input to the system is the transcript $D=[w_1^D, w_2^D, \ldots, w_n^D]$, consisting of n words, and a pool of tutorial textual content, i.e., $P=[T_1, T_2, \ldots, T_{|P|}]$ where $T_i=[w_1^T, w_2^T, \ldots, w_m^T]$ is the textual content of i-th tutorial including m words. The recommendation apparatus can find the most relevant tutorial from the pool P, i.e., $T_{gold}$.

According to some embodiments, a summarization network is configured to shorten the transcript D. For example, only the distinctive information is preserved and the redundant portions (i.e., portions which might not be useful to identify the most related tutorial) are excluded. In some cases, a deep learning model is trained to consume the input document D and generate a shorter document D', such that |D'|<|D|. A transformer-based language model (e.g., BERT) is trained to encode the words of the document D, i.e., $e_i=BERT(w_i)$ for all $w_i n \in D$. Additionally, words consisting of multiple word-pieces are represented using the average of the word-piece embeddings obtained from the BERT model.

At operation 610, the system determines that the relevance value corresponding to at least one word is below a threshold value. In some cases, the operations of this step refer to, or may be performed by, a summarization network as described with reference to FIGS. 3 and 4.

At operation 615, the system removes at least one word from the source document based on a hidden vector representation and the determination using a summarization network to obtain a summary document. In some cases, the operations of this step refer to, or may be performed by, a summarization network as described with reference to FIGS. 3 and 4.

The last hidden states of the BERT model are used to obtain the embedding vector $e_i$. Next, a feed-forward network can estimate the likelihood of the word $w_i$ to be included in the shorter document D':

$$P(w_i|D)=FF(w_i)=\sigma(W_1*(W_2*e_i+b_2)+b_1) \quad (1)$$

where $\sigma$ is the sigmoid activation function, $W_1$ and $W_2$ are the weight matrices and $b_1$ and $b_2$ are bias.

Unsupervised learning is used to train BERT model and feed-forward layer based on two criteria, i.e., distinctiveness and information retaining. Note there is not any labeled data. Training of the machine learning model will be described with greater detail in FIGS. 10-11.

Figure 7:
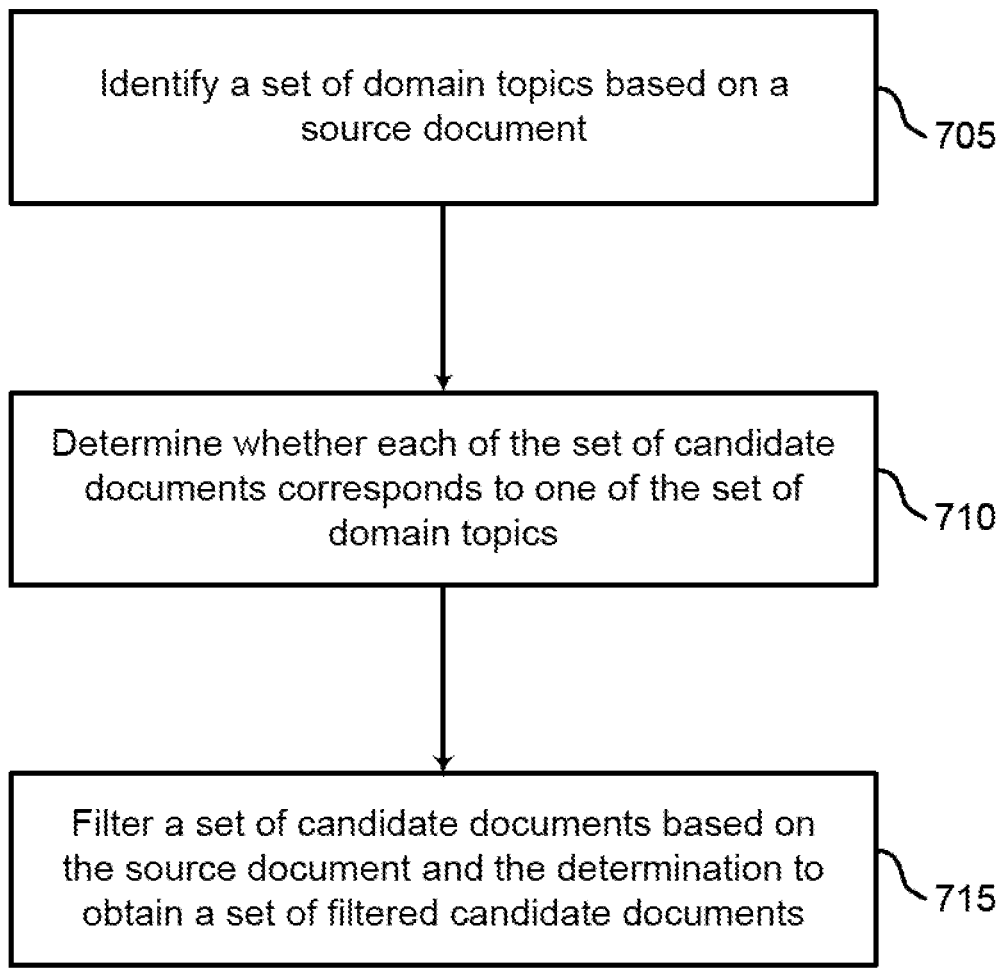
FIGS. 7 and 8 show examples of filtering a document according to aspects of the present disclosure.

FIG. 7 shows an example of filtering a document according to aspects of the present disclosure. A process of filtering a set of tutorials can be performed by a filtering component of the machine learning model as described in FIG. 3. The filtering component removes tutorials that are not relevant to a given transcript. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system identifies a set of domain topics based on a source document. In some cases, the operations of this step refer to, or may be performed by, a filtering component as described with reference to FIGS. 3 and 4.

A pool of tutorials may include multiple irrelevant candidates and the filtering component filters these irrelevant candidates out before ranking. The filtering component of the recommendation apparatus filters the pool P to remove unlikely candidates. In some examples, filter objective function $\Phi$ is defined such that:

$$|\Phi(P)| < |P|$$

$$\forall T_i \in \Phi(P), T_j \in P - \Phi(P) R(T_i) < R(T_j) \qquad (2)$$

where |•| is the size of the pool and R(x) is the rank of x in the sorted pool based on the relevance of candidates to the given transcript D. According to an embodiment, two types of criteria (i.e., domain-specific knowledge and string similarity) are used to define the function (P.

According to an embodiment of the present disclosure, ontology of names in the domains of interest (domain-specific knowledge) are considered and incorporated by the filtering component. For example, image editing tools such as Adobe® Photoshop may be used as a domain of interest and a set of tool names may be incorporated by Adobe® Photoshop as domains-specific knowledge.

At operation 710, the system determines whether each of the set of candidate documents corresponds to one of the set of domain topics. In some cases, the operations of this step refer to, or may be performed by, a filtering component as described with reference to FIGS. 3 and 4.

At operation 715, the system filters a set of candidate documents based on the source document and the determination to obtain a set of filtered candidate documents. In some cases, the operations of this step refer to, or may be performed by, a filtering component as described with reference to FIGS. 3 and 4.

In some cases, domain-specific knowledge is used in function $\Phi$ by locating tool names mentioned in the transcript D, i.e., TN={tn$_1$, tn$_2$, . . . , tn$_{|TN|}$} where tn$_i$ is a tool name in transcript D. Next, the filter function $\Phi_{DK}$ is defined to filter the set of tutorials in the pool P. In some cases, tutorials which do not mention one of the tool names of TN are filtered out:

$$\Phi_{DK}(T_i) = \begin{cases} \text{True} & \text{if } \exists\, tn_j \in TN \text{ s.t.} tn_j \in T_i \\ \text{False} & \text{otherwise} \end{cases} \qquad (3)$$

Figure 8:
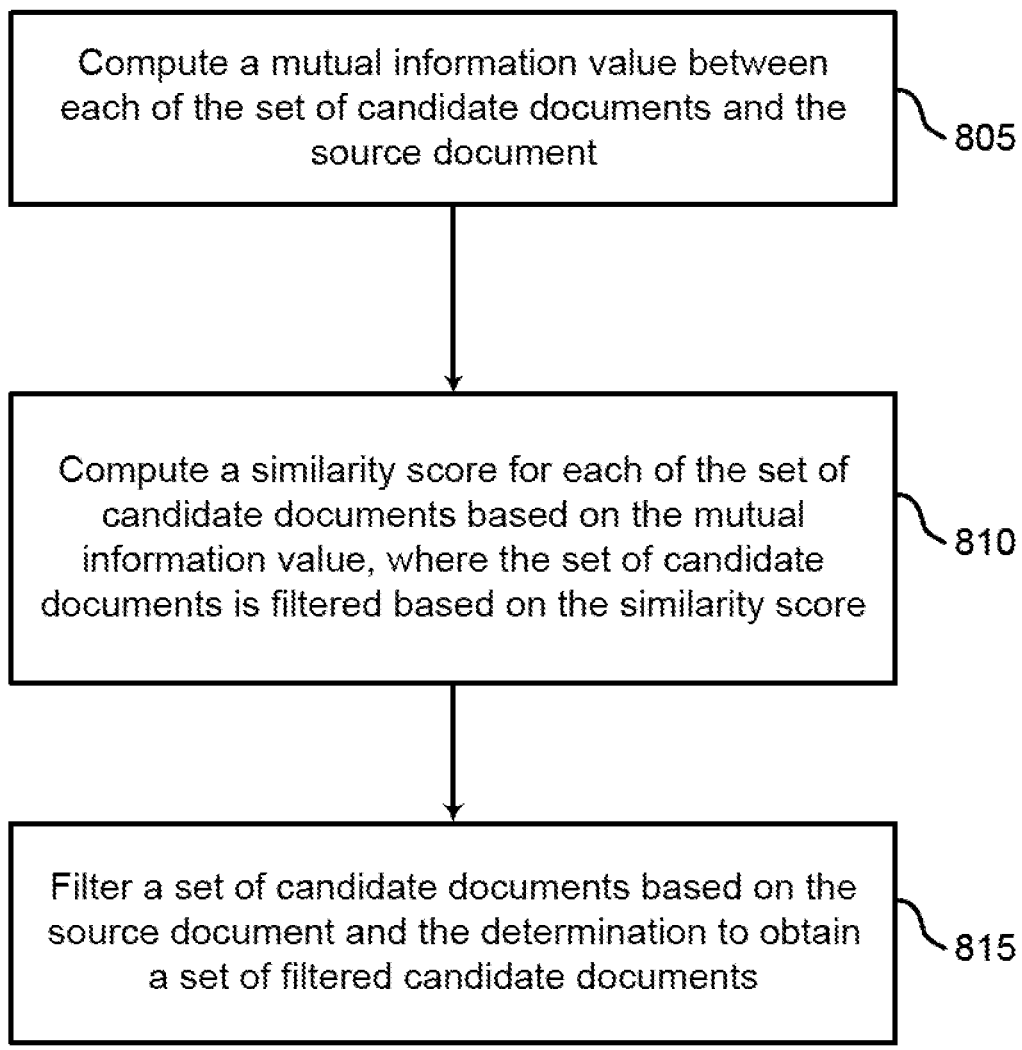

FIG. 8 shows an example of filtering a document according to aspects of the present disclosure. A process of filtering a set of tutorials can be performed by a filtering component of the machine learning model as described in FIG. 3. The filtering component incorporates or compares string similarity of the tutorial textual content with a given transcript in the filtering process. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system computes a mutual information value between each of the set of candidate documents and the source document. In some cases, the operations of this step refer to, or may be performed by, a filtering component as described with reference to FIGS. 3 and 4.

According to an embodiment, the filtering component of the machine learning model incorporates string similarity of the tutorial textual content with the transcript D in the filtering process. In some examples, the string similarity of the transcript D is computed with tutorial $T_i \in P$ using normalized point-wise mutual information (PMI):

$$Sim(D, T_i) = \sum_{w_i^D \in D} \sum_{w_j^T \in T_i} \frac{PMI(W_i^D, W_j^T)}{n * m} \qquad (4)$$

$$PMI(w_i, w_j) = \log \frac{\text{COUNT}(w_i, w_j)}{\text{COUNT}(w_i) * \text{COUNT}(w_j)}$$

where n and m are the number of words in the transcript D and tutorial T$_i$, COUNT(W$_i$) is the number of occurrences of the word w$_i$ in all transcripts in the training data and COUNT(w$_i$,w$_j$) is the number of occurrences of words w$_i$ and w$_j$ in a transcript in the training data.

At operation 810, the system computes a similarity score for each of the set of candidate documents based on the mutual information value, where the set of candidate documents is filtered based on the similarity score. In some cases, the operations of this step refer to, or may be performed by, a filtering component as described with reference to FIGS. 3 and 4.

The filter function is defined as the following based on similarity:

$$\Phi_{sim}(T_i) = \begin{cases} \text{True} & \text{if } Sim(D, T_i) > \delta \\ \text{False} & \text{otherwise} \end{cases} \qquad (5)$$

where $\delta$ is a hyper-parameter tuned using development data. The final filter function $\Phi$ is defined using the above filter functions $\Phi_{DK}$ and $\Phi_{Sim}$:

$$\Phi(T_i) = \begin{cases} \text{True} & \text{if } \Phi_{DK}(T_i) \text{ and } \Phi_{Sim}(T_i) \\ \text{False} & \text{otherwise} \end{cases} \qquad (6)$$

At operation 815, the system filters a set of candidate documents based on the source document and the determination to obtain a set of filtered candidate documents. In some cases, the operations of this step refer to, or may be performed by, a filtering component as described with reference to FIGS. 3 and 4.

Figure 9:
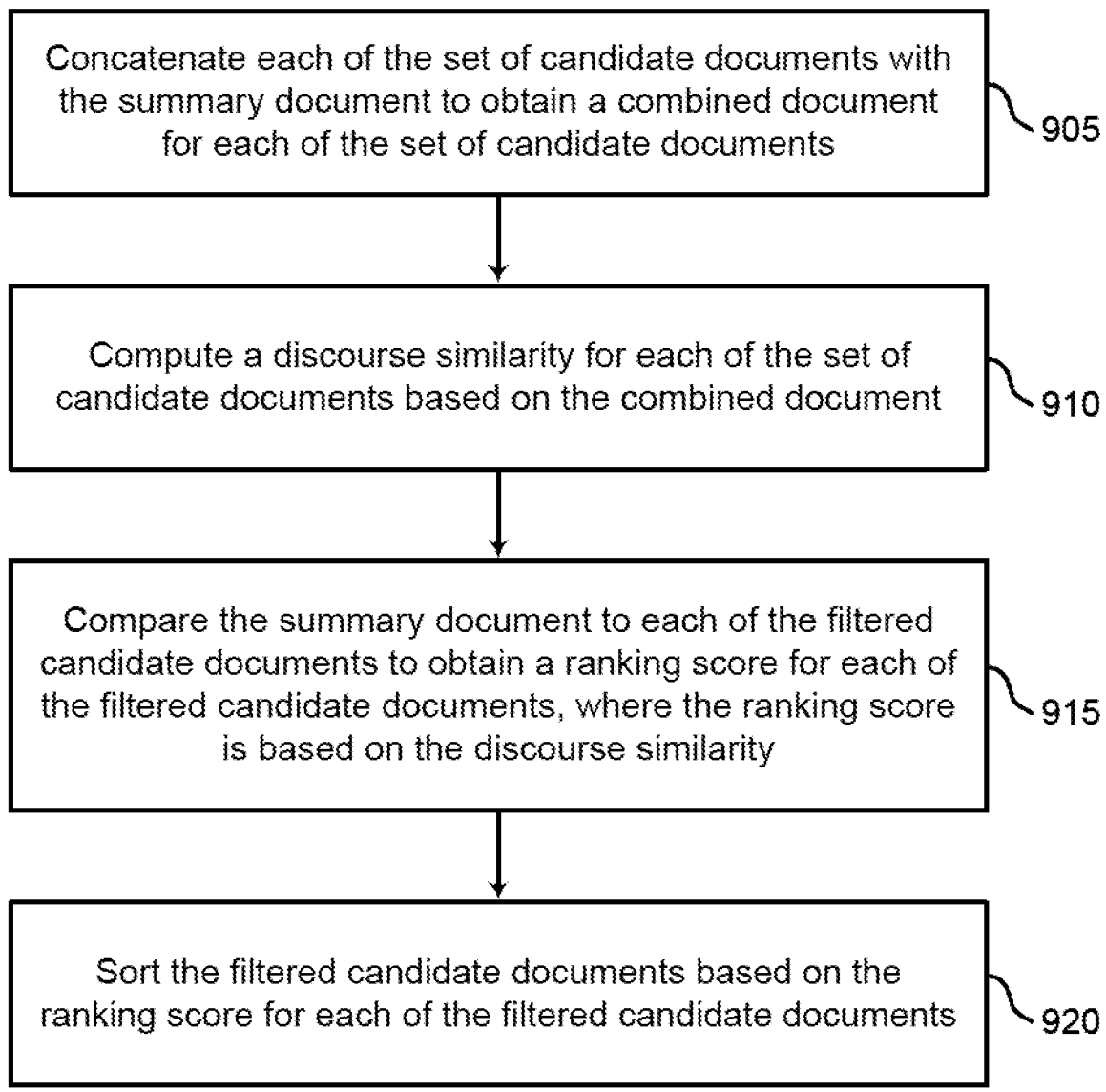
FIG. 9 shows an example of ranking documents based on discourse similarity according to aspects of the present disclosure.

FIG. 9 shows an example of ranking documents based on discourse similarity according to aspects of the present disclosure. A ranking network of the machine learning model (see FIG. 3) is configured to sort tutorials based on relevance to a given transcript. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system concatenates each of the set of candidate documents with the summary document to obtain a combined document for each of the set of candidate documents. In some cases, the operations of this step refer to, or may be performed by, a ranking network as described with reference to FIGS. 3 and 4.

According to an embodiment, a ranking network is configured to sort tutorials based on relevance of each tutorial to a given transcript. In some cases, for a given short document D' and the filtered set of tutorials, i.e., P'=Φ(P), the ranking network can sort the tutorials based on their relevance to the given transcript using two types of scores (i.e., string similarity and discourse similarity).

The string similarity between every tutorial $T_i \in P'$ with the summary D' is evaluated using a library for learning word representations (i.e., fastText). FastText is a lightweight library for learning text representations and text classifiers. As a result, the associated string similarity score is obtained: $Score_{str}$=FastText($T_i$,D').

At operation 910, the system computes a discourse similarity for each of the set of candidate documents based on the combined document. In some cases, the operations of this step refer to, or may be performed by, a ranking network as described with reference to FIGS. 3 and 4.

Discourse similarity score measures the likelihood of a tutorial $T_i$P' to complement the summary D' of an input transcript. A text classification model C is trained that concatenates the transcripts. For example, the classification model may use the concatenation of first and second half of the transcripts $D_i$, i.e., $D_{i,1}$ and $D_{i,2}$, as positive sample and the concatenation of $D_{i,1}$ and $D_{j,2}$ as negative samples. In some examples, j is selected randomly. The words of the documents are encoded using an unsupervised learning algorithm (i.e., GloVe embedding) and the max-pooled embeddings of the words are input to the text classification model C. The model is trained using a similar loss function as Equation 10 below. Next, the trained text classification model C is employed in the ranking network by feeding the concatenation of the tutorial $T_i$ and summary D' as input to the model. The model and its output, i.e., the likelihood of the input to complement each other, is used as the discourse-level score: $Score_{disc}$=C([$T_i$:D']).

At operation 915, the system compares the summary document to each of the filtered candidate documents to obtain a ranking score for each of the filtered candidate documents, where the ranking score is based on the discourse similarity. In some cases, the operations of this step refer to, or may be performed by, a ranking network as described with reference to FIGS. 3 and 4.

According to an embodiment, sum of the two scores (i.e., $Score_{str}$ and $Score_{disc}$) is computed to sort the set of the filtered candidate documents. The sorted list of tutorials (i.e., the sorted set of the filtered candidate documents) is the final output of the recommendation system.

$$Score=Score_{str}+Score_{disc} \quad (7)$$

At operation 920, the system sorts the filtered candidate documents based on the ranking score for each of the filtered candidate documents. In some cases, the operations of this step refer to, or may be performed by, a ranking network as described with reference to FIGS. 3 and 4.

Training and Evaluation

Figure 10:
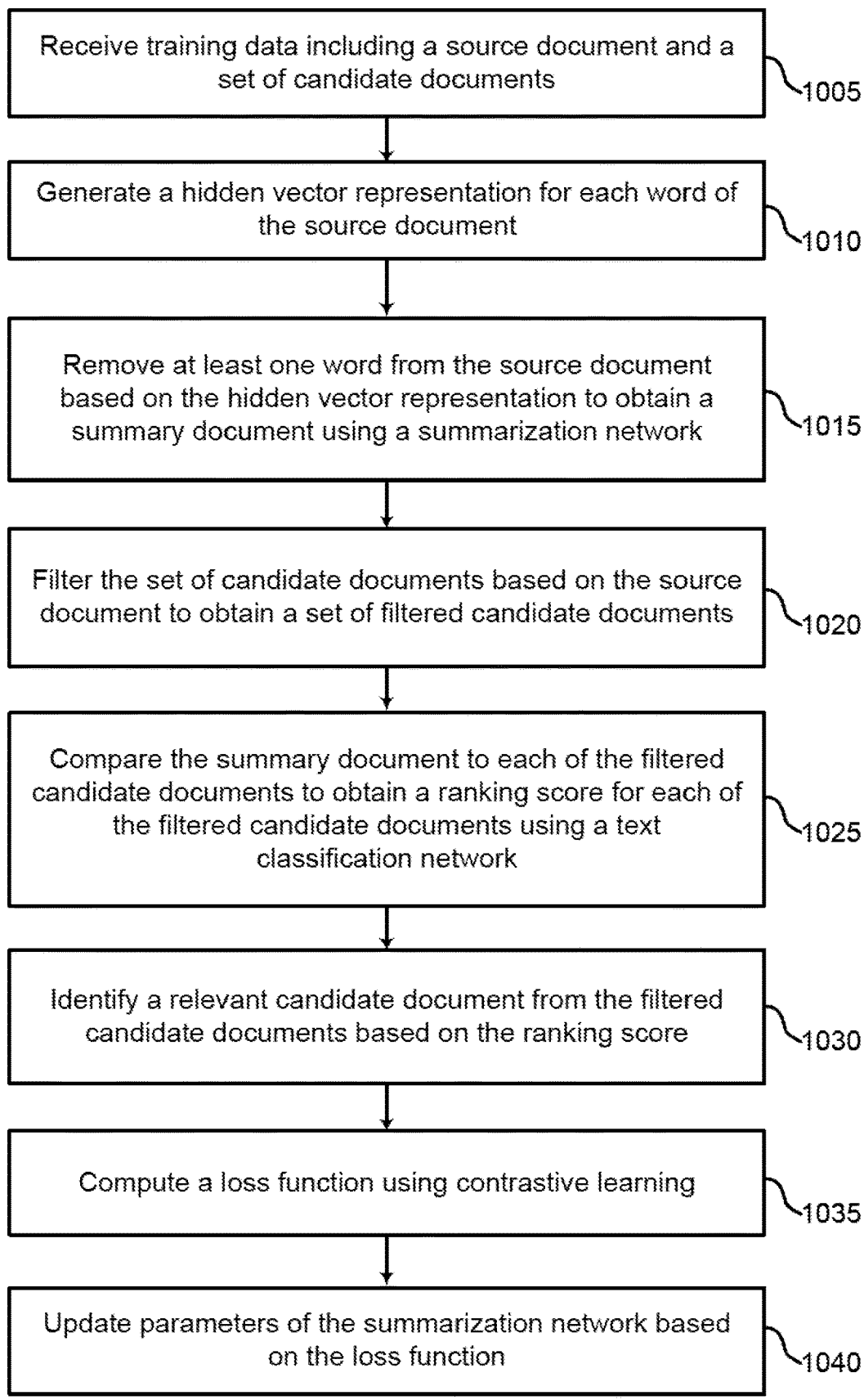
FIG. 10 shows an example of training a neural network for item recommendation according to aspects of the present disclosure.
Figure 11:
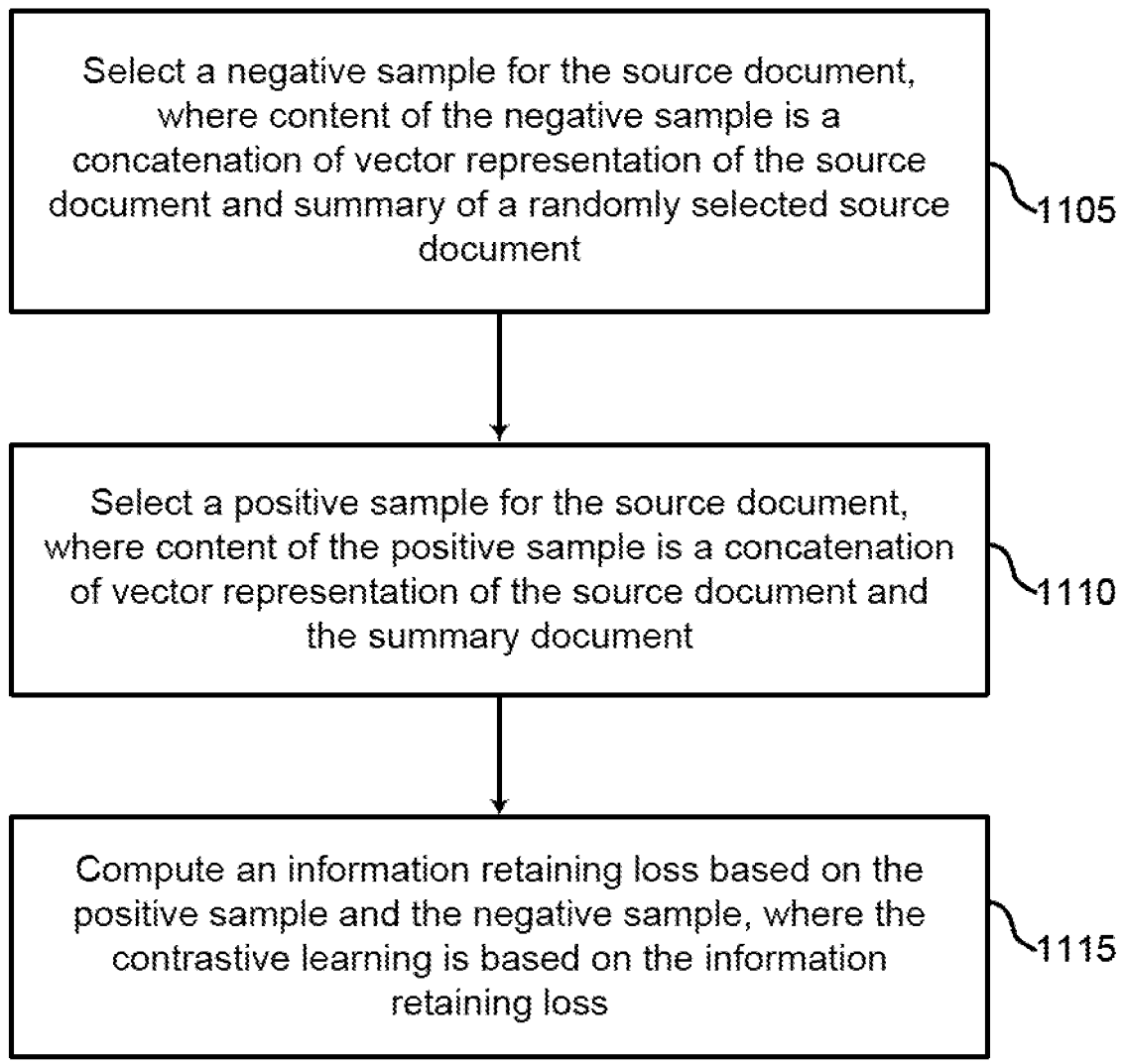
FIG. 11 shows an example of training a neural network using contrastive learning according to aspects of the present disclosure.

In FIGS. 10-11, a method, apparatus, and non-transitory computer readable medium for training a neural network are described. One or more embodiments of the method, apparatus, and non-transitory computer readable medium include receiving training data including a source document and a plurality of candidate documents; generating a hidden vector representation for each word of the source document; removing at least one word from the source document based on the hidden vector representation to obtain a summary document using a summarization network; filtering the plurality of candidate documents based on the source document to obtain a plurality of filtered candidate documents; comparing the summary document to each of the filtered candidate documents to obtain a ranking score for each of the filtered candidate documents using a text classification network; identifying a relevant candidate document from the filtered candidate documents based on the ranking score; computing a loss function using contrastive learning; and updating parameters of the summarization network based on the loss function.

Some examples of the method, apparatus, and non-transitory computer readable medium further include generating an additional summary document based on an additional source document using the summarization network. Some examples further include computing a distinctiveness loss such that text of the additional summary document is substantially different from content of the summary document, wherein the parameters of the summarization network are updated based on the distinctiveness loss.

Some examples of the method, apparatus, and non-transitory computer readable medium further include selecting a negative sample for the source document, wherein content of the negative sample is a concatenation of vector representation of the source document and summary of a randomly selected source document. Some examples further include selecting a positive sample for the source document, wherein content of the positive sample is a concatenation of vector representation of the source document and the summary document. Some examples further include computing an information retaining loss based on the positive sample and the negative sample, wherein the contrastive learning is based on the information retaining loss.

Some examples of the method, apparatus, and non-transitory computer readable medium further include updating parameters of the text classification network jointly with the parameters of the summarization network. In some examples, the summarization network includes a pre-trained encoder and a feed forward network.

FIG. 10 shows an example of training a neural network for item recommendation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

One or more embodiments of the present disclosure use unsupervised learning to the machine learning model as described in FIG. 3. Unsupervised learning is one of three basic machine learning paradigms, alongside supervised learning and reinforcement learning. Unsupervised learning draws inferences from datasets consisting of input data without labeled responses. Unsupervised learning may be used to find hidden patterns or grouping in data. For example, cluster analysis is a form of unsupervised learning. Clusters may be identified using measures of similarity such as Euclidean or probabilistic distance.

At operation 1005, the system receives training data including a source document and a set of candidate documents. In some cases, the operations of this step refer to, or may be performed by, a training component as described with reference to FIG. 3. In some examples, the source document is denoted as input document D. A set of candidate documents include tutorial textual content, i.e., $P=[T_1, T_2, \ldots, T_{|P|}]$ where $T_i=[w_1^T, w_2^T, \ldots, w_m^T]$ is the textual content of i-th tutorial including m words. The recommendation apparatus is trained to locate a most relevant tutorial from the pool P, i.e., $T_{gold}$.

At operation 1010, the system generates a hidden vector representation for each word of the source document. In some cases, the operations of this step refer to, or may be performed by, a word embedding component as described with reference to FIGS. 3 and 4. In some examples, a transformer-based language model (e.g., BERT) is trained to encode the words of the document D. The last hidden states of the BERT model are used to obtain the embedding vector $e_i$.

At operation 1015, the system removes at least one word from the source document based on the hidden vector representation to obtain a summary document using a summarization network. In some cases, the operations of this step refer to, or may be performed by, a summarization network as described with reference to FIGS. 3 and 4. The summarization network is trained using unsupervised deep learning to summarize a given transcript and preserve important information that is used subsequently in locating the relevant tutorials from candidate tutorials.

At operation 1020, the system filters the set of candidate documents based on the source document to obtain a set of filtered candidate documents. In some cases, the operations of this step refer to, or may be performed by, a filtering component as described with reference to FIGS. 3 and 4. In some examples, a filtering component of the recommendation apparatus can remove irrelevant tutorials considering a given transcript. The filtering component uses domain-specific knowledge to evaluate the relevance between a given transcript and the tutorial textual content.

At operation 1025, the system compares the summary document to each of the filtered candidate documents to obtain a ranking score for each of the filtered candidate documents using a text classification network. In some cases, the operations of this step refer to, or may be performed by, a ranking network as described with reference to FIGS. 3 and 4.

According to an embodiment, a ranking network is configured to sort tutorials based on relevance to a given transcript. In some cases, for a given short document D' and the filtered set of tutorials obtained from above operation, i.e., $P'=\Phi(P)$, the ranking network sort the tutorials based on their relevance to the given transcript using scores (i.e., string similarity and discourse similarity).

At operation 1030, the system identifies a relevant candidate document from the filtered candidate documents based on the ranking score. In some cases, the operations of this step refer to, or may be performed by, a user interface as described with reference to FIG. 4.

At operation 1035, the system computes a loss function using contrastive learning. In some cases, the operations of this step refer to, or may be performed by, a training component as described with reference to FIG. 3.

In some examples, distinctiveness is considered when training the summarization network (the BERT model). In some cases, distinctiveness refers to different or distinct shorter documents $D'_i$ and $D'_j$ obtained from the original documents $D_i$ and $D_j$. $D_i$ and $D_j$ should be as different as possible. Additionally, those portions of the documents $D_i$ and $D_j$ that do not appear in the summary may have less differences (i.e., portions that are not informative such as chitchat have more similarity between them). Loss function $\mathcal{L}_{dist}$ is formulated as follows:

$$\mathcal{L}_{dist}=\alpha*(\sigma(H'_i)\odot(H'_j))-\beta(\sigma(H''_i)\odot a(H''_j)) \quad (8)$$

where $\alpha$ is the softmax function, $\alpha$ and $\beta$ are the trade-off parameters and $\odot$ is the hadamard product. The vectors $H'_i$, $H'_j$, $H''_i$ and $H''_j$ are the vector representation for the summaries $D'_i$, $D'_j$, and the portions of the documents $D_i$ and $D_j$ not included in the summaries, i.e., $D''_i$ and $D''_j$, respectively.

The vector representations are obtained via max-pooling on the multiplication of the embedding vectors and the feed-forward network. For example, $H'_i$ is obtained as:

$$H'_i = \text{MAX\_POOL}(h_1, h_2, \ldots, h_n)$$

$$h_k = e_k * FF(e_k) \quad (9)$$

where n is the number of words in the document D. As for representations of $H''_i$ and $H''_j$, $FF(e_k)$ is replaced with $(1-FF(e_k))$ in the above equation.

At operation 1040, the system updates parameters of the summarization network based on the loss function. In some cases, the operations of this step refer to, or may be performed by, a training component as described with reference to FIG. 3.

FIG. 11 shows an example of training a neural network using contrastive learning according to aspects of the present disclosure. The summarization network of the machine learning model (see FIG. 3) is trained using contrastive learning. In some examples, a text classification network is trained jointly with the summarization network. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system selects a negative sample for the source document, where content of the negative sample is a concatenation of vector representation of the source document and summary of a randomly selected source document. In some cases, the operations of this step refer to, or may be performed by, a training component as described with reference to FIG. 3.

In some cases, information retaining refers to a process of summarizing a document D into a smaller version D' while preserving important information from D. Information available in both documents D and D' can have overlap and the extent of overlap can be adjusted by increasing the mutual information (MI) between the representations of D and D'. For example, contrastive learning is used to increase mutual information between D and D'. A discriminator is trained to distinguish positive samples from negative samples. A negative sample is the concatenation of the representation of the document $D_i$ with the summary of the randomly selected document $D_1$, i.e., neg=$[H_i:H'_j]$. A loss function is used to increase the mutual information as follows:

$$\mathcal{L}_{IR} = -(\log(\Psi[H_i:H'_i]) + \log(1-\Psi([H_i:H'_j]))) \qquad (10)$$

where $\Psi$ is the discriminator.

At operation 1110, the system selects a positive sample for the source document, where content of the positive sample is a concatenation of vector representation of the source document and the summary document. In some cases, the operations of this step refer to, or may be performed by, a training component as described with reference to FIG. 3. In some examples, a positive sample is the concatenation of the representation of the original document $D_i$ and its summary $D'_i$, i.e., pos=$[H_i:H'_i]$.

At operation 1115, the system computes an information retaining loss based on the positive sample and the negative sample, where the contrastive learning is based on the information retaining loss. In some cases, the operations of this step refer to, or may be performed by, a training component as described with reference to FIG. 3.

In some examples, the sum of two losses, i.e., $\mathcal{L}_{dist}$ and $\mathcal{L}_{IR}$ is the final loss function to train the summarization network of the machine learning model:

$$\mathcal{L}_{IR} + \alpha \mathcal{L}_{IR} \beta \mathcal{L}_{dist} \qquad (11)$$

where $\alpha$ and $\beta$ are trade-off parameters. The output of the feed-forward network FF and every word, i.e., each word $w_i$ with a corresponding value from FF higher than a threshold is selected in D', is used at inference time to summarize the input transcript.

Performance of apparatus, systems and methods of the present disclosure have been evaluated, and results indicate embodiments of the present disclosure have obtained increased performance over existing technology. Example experiments demonstrate that the recommendation network outperforms conventional systems.

Some experiments manually annotate transcripts from the Behance corpus to evaluate the recommendation system of the present disclosure. In some examples, the transcripts of videos are streamed on a creative network (e.g., Behance.net) and the streamers use Adobe® Photoshop application in the streamed video. Additionally, more than 200 Adobe® Photoshop tutorials are used as the initial pool of tutorials. In some cases, string similarity sorting, keyword sorting, and information-based sorting are used to evaluate the performance of the network model.

In case of string similarity sorting, the string similarity of the input transcript and the tutorials are measured and used to sort the set of tutorials in a pool. A keyword sorting system sorts the set of tutorials based on the number of tool names that the set of tutorials have in common with the input transcript. An information-based sorting system uses a PMI-based scoring to sort the set of tutorials.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method, comprising:
generating a hidden vector representation for each word of a source document;
removing at least one word from the source document based on the hidden vector representation using a summarization network to obtain a summary document;
computing a mutual information value based on a number of occurrences of a word in the summary document and a number of occurrences of the word in a training set;
computing a first similarity score for a candidate document based on the mutual information value;
filtering a plurality of candidate documents based on the first similarity score to obtain a plurality of filtered candidate documents including the candidate documents;
concatenating the summary document and the candidate document to obtain a combined document;
computing a second similarity score for the candidate document based on the combined document;
computing a ranking score for the candidate document based on the second similarity score; and
identifying the candidate document from the filtered candidate documents based on the ranking score.

2. The method of claim 1, further comprising:
transcribing a media file to obtain the source document.

3. The method of claim 1, further comprising:
generating a relevance value for each word of the source document; and
determining that the relevance value corresponding to the at least one word is below a threshold value, wherein the at least one word is removed from the source document based on the determination.

4. The method of claim 1, further comprising:
computing an average of word piece representations for a plurality of word pieces corresponding to a composite word of the source document to obtain the hidden vector representation corresponding to the composite word.

5. The method of claim 1, further comprising:
identifying a plurality of domain topics based on the source document; and determining whether each of the plurality of candidate documents corresponds to one of the plurality of domain topics, wherein the plurality of candidate documents is filtered based on the determination.

6. The method of claim 5, wherein:
the plurality of domain topics comprise a tool name.

7. The method of claim 1, further comprising:
computing a string similarity between the summary document and each of the plurality of candidate documents, wherein the ranking score is based on the string similarity.

8. The method of claim 1, further comprising:
concatenating each of the plurality of candidate documents with the summary document to obtain a combined document for each of the plurality of candidate documents; and
computing a discourse similarity for each of the plurality of candidate documents based on the combined document, wherein the ranking score is based on the discourse similarity.

9. The method of claim 1, further comprising:
sorting the filtered candidate documents based on the ranking score for each of the filtered candidate documents.

10. The method of claim 9, further comprising:
displaying the sorted filtered candidate documents.

11. A method for training a neural network, comprising:
receiving training data including a source document and a plurality of candidate documents;
generating a hidden vector representation for each word of the source document;
removing at least one word from the source document based on the hidden vector representation to obtain a summary document using a summarization network;
computing a mutual information value based on a number of occurrences of a word in the summary document and a number of occurrences of the word in a training set;
computing a first similarity score for a candidate document based on the mutual information value;
filtering the plurality of candidate documents based on the first similarity score to obtain a plurality of filtered candidate documents including the candidate documents;
concatenating the summary document and the candidate document to obtain a combined document;
computing a second similarity score for the candidate document based on the combined document;
computing a ranking score for the candidate document based on the second similarity score using a text classification network;
identifying the candidate document from the filtered candidate documents based on the ranking score;
computing a loss function using contrastive learning; and
updating parameters of the summarization network based on the loss function.

12. The method of claim 11, further comprising:
generating an additional summary document based on an additional source document using the summarization network; and
computing a distinctiveness loss such that text of the additional summary document is substantially different from content of the summary document, wherein the parameters of the summarization network are updated based on the distinctiveness loss.

13. The method of claim 11, further comprising:
selecting a negative sample for the source document, wherein content of the negative sample is a concatenation of vector representation of the source document and summary of a randomly selected source document;
selecting a positive sample for the source document, wherein content of the positive sample is a concatenation of vector representation of the source document and the summary document; and
computing an information retaining loss based on the positive sample and the negative sample, wherein the contrastive learning is based on the information retaining loss.

14. The method of claim 11, further comprising:
updating parameters of the text classification network jointly with the parameters of the summarization network.

15. The method of claim 11, wherein:
the summarization network includes a pre-trained encoder and a feed forward network.

16. An apparatus, comprising:
a word embedding component configured to generate a hidden vector representation for each word of a source document;
a summarization network configured to remove at least one word from the source document based on the hidden vector representation to obtain a summary document;
a filtering component configured to compute a mutual information value based on a number of occurrences of a word in the summary document and a number of occurrences of the word in a training set, compute a first similarity score for a candidate document based on the mutual information value, and filter a plurality of candidate documents based on the first similarity score to obtain a plurality of filtered candidate documents including the candidate documents; and
a ranking network configured to concatenate the summary document and the candidate document to obtain a combined document, compute a second similarity score for the candidate document based on the combined document, and compute a ranking score for the candidate document based on the second similarity score.

17. The apparatus of claim 16, further comprising:
a user interface configured to identify a relevant candidate document from the filtered candidate documents based on the ranking score.

18. The apparatus of claim 16, further comprising:
a transcribing component configured to transcribe a media file to obtain the source document.

19. The apparatus of claim 16, wherein:
the ranking network is configured to sort the filtered candidate documents based on the ranking score for each of the filtered candidate documents, and display the sorted filtered candidate documents.

\* \* \* \* \*